United States Patent
Cropper et al.

(10) Patent No.: US 10,419,228 B2
(45) Date of Patent: *Sep. 17, 2019

(54) DYNAMICALLY-ASSIGNED RESOURCE MANAGEMENT IN A SHARED POOL OF CONFIGURABLE COMPUTING RESOURCES

(71) Applicant: International Business Machines Corporation, Armonk, NY (US)

(72) Inventors: Joseph W. Cropper, Rochester, MN (US); Sadek Jbara, Taybe (IL); Taylor D. Peoples, Austin, TX (US)

(73) Assignee: International Busines Machines Corporation, Armonk, NY (US)

(*) Notice: Subject to any disclaimer, the term of this patent is extended or adjusted under 35 U.S.C. 154(b) by 633 days.

This patent is subject to a terminal disclaimer.

(21) Appl. No.: 14/986,702

(22) Filed: Jan. 3, 2016

(65) Prior Publication Data

US 2017/0111287 A1    Apr. 20, 2017

Related U.S. Application Data

(63) Continuation of application No. 14/884,697, filed on Oct. 15, 2015.

(51) Int. Cl.

| | | |
|---|---|---|
| G06F 15/16 | (2006.01) | |
| H04L 12/14 | (2006.01) | |
| H04L 12/923 | (2013.01) | |
| H04L 12/911 | (2013.01) | |
| G06F 11/00 | (2006.01) | |

(52) U.S. Cl.
CPC .......... H04L 12/1428 (2013.01); G06F 11/00 (2013.01); H04L 47/762 (2013.01); H04L 47/783 (2013.01)

(58) Field of Classification Search
CPC . H04L 12/1428; H04L 47/762; H04L 47/783; G06F 11/00
USPC ......................................... 709/226, 223, 217
See application file for complete search history.

(56) References Cited

U.S. PATENT DOCUMENTS

| | | | |
|---|---|---|---|
| 9,584,597 B2* | 2/2017 | James | ................ H04L 67/1025 |
| 2005/0019787 A1* | 1/2005 | Berno | ..................... G06F 19/18 |
| | | | 435/6.11 |
| 2013/0215833 A1* | 8/2013 | Ong | .................... H04L 43/0817 |
| | | | 370/329 |
| 2013/0262677 A1 | 10/2013 | Olsen et al. | |
| 2014/0137110 A1 | 5/2014 | Engle et al. | |
| 2015/0212840 A1 | 7/2015 | Biran et al. | |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Jeffrey R Swearingen
*Assistant Examiner* — Oluwatosin M Gidado
(74) *Attorney, Agent, or Firm* — Jared L. Montanaro

(57) ABSTRACT

Disclosed aspects manage a shared pool of configurable computing resources. A resource demand value is identified for a target host. Resource supply values of dynamically-assigned resources are computed for donor hosts. Using the resource demand value and the resource supply values, dynamically-assigned resources are reclaimed from the donor hosts and distributed to the target host.

20 Claims, 8 Drawing Sheets

(56) References Cited

U.S. PATENT DOCUMENTS

2016/0150047 A1* 5/2016 O'Hare ................ G06F 3/0619
 713/168
2016/0381124 A1* 12/2016 Hwang ................ H04L 67/101
 709/226
2017/0111289 A1 4/2017 Cropper et al.
2017/0300359 A1 10/2017 Kollur et al.

OTHER PUBLICATIONS

IBM, Power Enterprise Pool, <http://www-01.ibm.com/support/knowledgecenter/P8ESS/p8ha2/systempool_cod.htm>.
Hewlett-Packard, Instant Capacity on Demand, <http://h20223.www2.hp.com/nonstopcomputing/cache/77296-0-0-0-121.html>.
Cropper et al., "Dynamically-Assigned Resource Management in a Shared Pool of Configurable Computing Resources", U.S. Appl. No. 14/884,697, filed Oct. 15, 2015.
List of IBM Patents or Patent Applications Treated As Related.
Cropper et al., "Dynamically-Assigned Resource Management in a Shared Pool of Configurable Computing Resources," U.S. Appl. No. 16/371,905, filed Apr. 1, 2019.
List of IBM Patents or Patent Applications Treated as Related, Apr. 1, 2019, 2 pgs.

* cited by examiner

US 10,419,228 B2

DYNAMICALLY-ASSIGNED RESOURCE MANAGEMENT IN A SHARED POOL OF CONFIGURABLE COMPUTING RESOURCES

BACKGROUND

This disclosure relates generally to computer systems and, more particularly, relates to dynamically-assigned resource management in a shared pool of configurable computing resources. The amount of data that needs to be managed by enterprises is increasing. Management of a shared pool of configurable computing resources may be desired to be performed as efficiently as possible. As data needing to be managed increases, the need for management efficiency may increase.

SUMMARY

Aspects of the disclosure relate to capacity-on-demand technology which allows compute servers to have compute resources dynamically assigned/activated/reclaimed. Disclosed aspects may be used to determine which physical hosts to reclaim dynamically-assigned resources from. Also, the number of dynamically-assigned resources to reclaim from (each of) the physical hosts may be computed. The reclaimed resources can be made available for use by other hosts in the cloud via a distribution or reclamation policy. Reclamation of dynamically-assigned resources which facilitates efficient operations may occur without manual intervention.

Aspects of the disclosure manage a shared pool of configurable computing resources. A resource demand value is identified for a target host. Resource supply values of dynamically-assigned resources are computed for donor hosts. Using the resource demand value and the resource supply values, dynamically-assigned resources are reclaimed from the donor hosts and distributed to the target host. Capacity-on-demand resources can have burdens for customers and efficient usage of such resources can provide performance benefits such as load balancing, for example.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
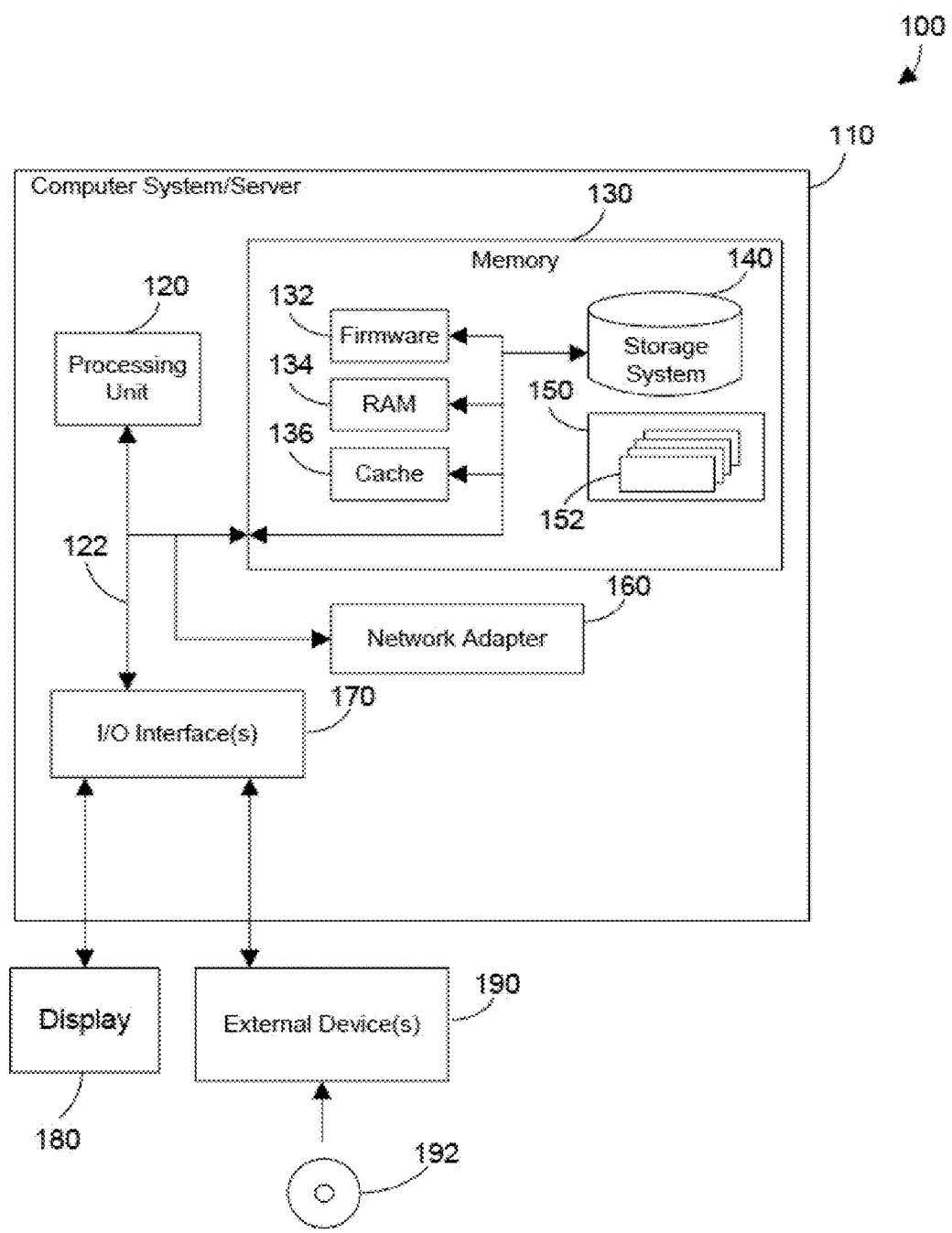
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to capacity-on-demand technology which allows compute servers to have compute resources (e.g., processors, memory) dynamically assigned/activated/reclaimed (e.g., to make efficient use of licenses). Disclosed aspects may be used to determine which physical hosts to reclaim dynamically-assigned resources (e.g., mobile capacity-on-demand resources) from. Also, the number of dynamically-assigned resources to reclaim from (each of) the physical hosts may be computed (using a number of dynamically-assigned resources that need to be reclaimed). The reclaimed resources can be made available for immediate use by other hosts in the cloud via a distribution or reclamation policy (e.g., without manual intervention). Reclamation of dynamically-assigned resources which facilitates efficient operations may occur without manual intervention. Capacity-on-demand resources can be expensive for customers and efficient usage of such resources can provide performance benefits such as load balancing, for example.

Aspects of the disclosure include a method, system, and computer program product for managing a shared pool of configurable computing resources. The shared pool of configurable computing resources may include a target physical host. A resource demand value can be identified with respect to the target physical host. The resource demand value may be identified in order to achieve (e.g., meet) a target-physical-host-threshold-resource-utilization (i.e., threshold resource utilization on the target physical host).

A first resource supply value is computed with respect to a first donor physical host of the shared pool of configurable computing resources. The first resource supply value corresponds to a first set of dynamically-assigned resources on the first donor physical host. The first resource supply value indicates expected achievement (e.g., meeting) of a first-donor-physical-host-threshold-resource-utilization (i.e., threshold resource utilization on the first donor physical host) without the first set of dynamically-assigned resources.

A second resource supply value is computed with respect to a second donor physical host of the shared pool of configurable computing resources. The second resource supply value corresponds to a second set of dynamically-assigned resources on the second donor physical host. The second resource supply value indicates expected achievement (e.g., meeting) of a second-donor-physical-host-threshold-resource-utilization (i.e., threshold resource utilization on the second donor physical host) without the second set of dynamically-assigned resources.

Without exceeding the first resource supply value, a first dynamically-assigned resource is reclaimed from the first set of dynamically-assigned resources. Without exceeding the second resource supply value, a second dynamically-assigned resource is reclaimed from the second set of dynamically-assigned resources. Reclaiming dynamically-assigned resources may continue as such to achieve the resource demand value (e.g., if the resource demand value is 5 and zero dynamically-assigned resources exist in an unassigned pool, reclaim at least 5 dynamically-assigned resources which have been assigned to hosts). To meet the resource demand value in order to achieve the target-physical-host-threshold-resource-utilization, the first and second dynamically-assigned resources are distributed to the target physical host (e.g., thereby reducing the resource utilization on the target physical host to a level at or below its threshold resource utilization).

In embodiments, a reclamation pattern for reclaiming a group of dynamically-assigned resources (e.g., the first and second dynamically-assigned resources) may be determined. The determined reclamation pattern may use a striping criterion to resolve a round-robin methodology of reclaiming dynamically-assigned resources. Other reclamation patterns using a packing criterion or a resource-utilization criterion are also possible. For instance, an example reclamation pattern may use a combination of the striping criterion and the resource-utilization criterion. As such, a reclamation order may be determined based on both a group of resource supply values for a group of donor physical hosts and a group of predicted-donor-physical-host-resource-utilizations.

In various embodiments, computing the first resource supply value includes a set of operations. A predicted-first-donor-physical-host-resource-utilization with one fewer unit of the first set of dynamically-assigned resources on the first donor physical host may be calculated. The predicted-first-donor-physical-host-resource-utilization can be compared with the first-donor-physical-host-threshold-resource-utilization. In response to the first-donor-physical-host-threshold-resource-utilization exceeding the predicted-first-donor-physical-host-resource-utilization, the first resource supply value may be incremented by one unit. In response to the predicted-first-donor-physical-host-resource-utilization exceeding the first-donor-physical-host-threshold-resource-utilization, the first resource supply value may be solidified for the first donor physical host (without incrementing the first resource supply value). Altogether, performance or efficiency benefits when managing a shared pool of configurable computing resources may occur (e.g., speed, flexibility, responsiveness, availability, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
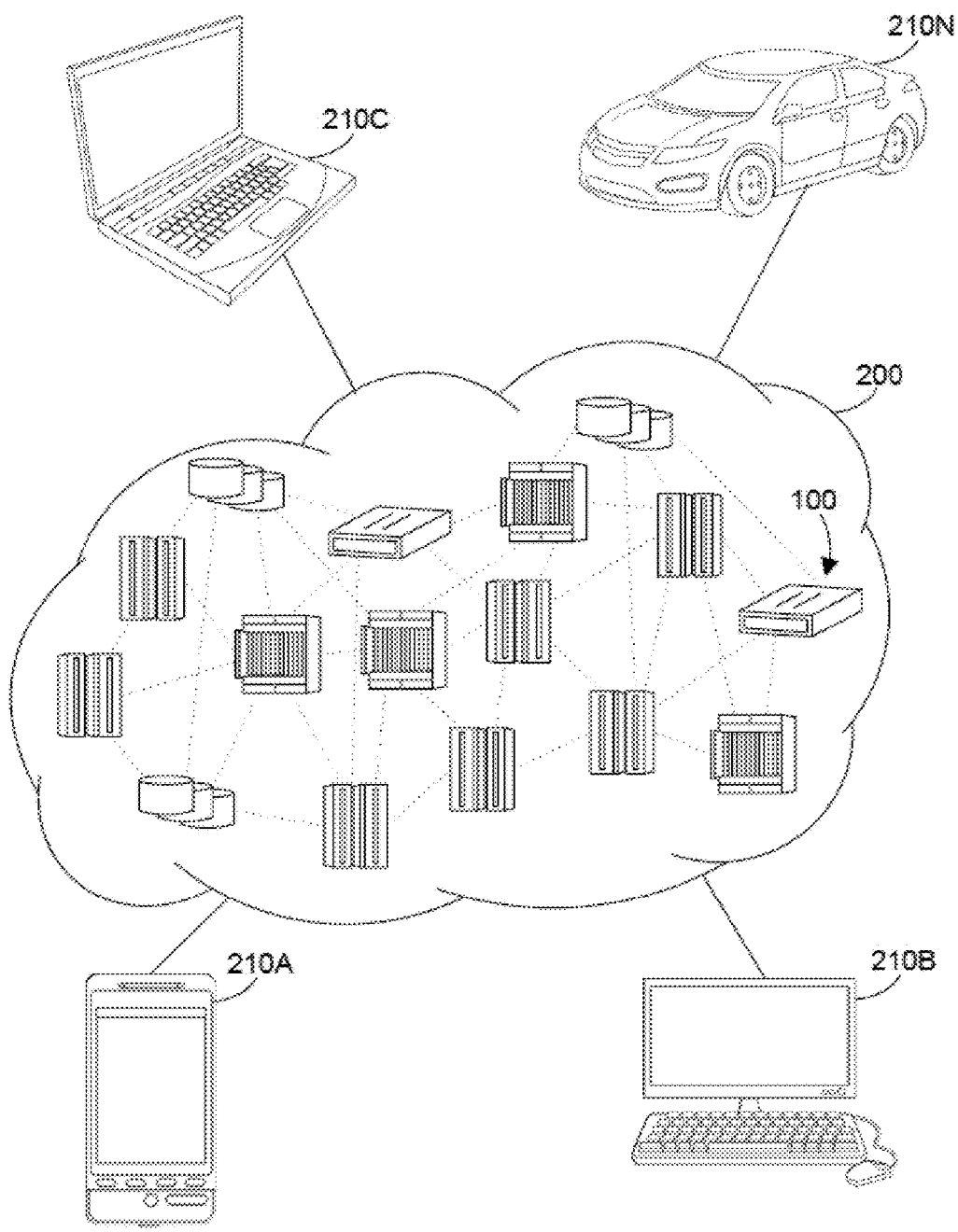
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
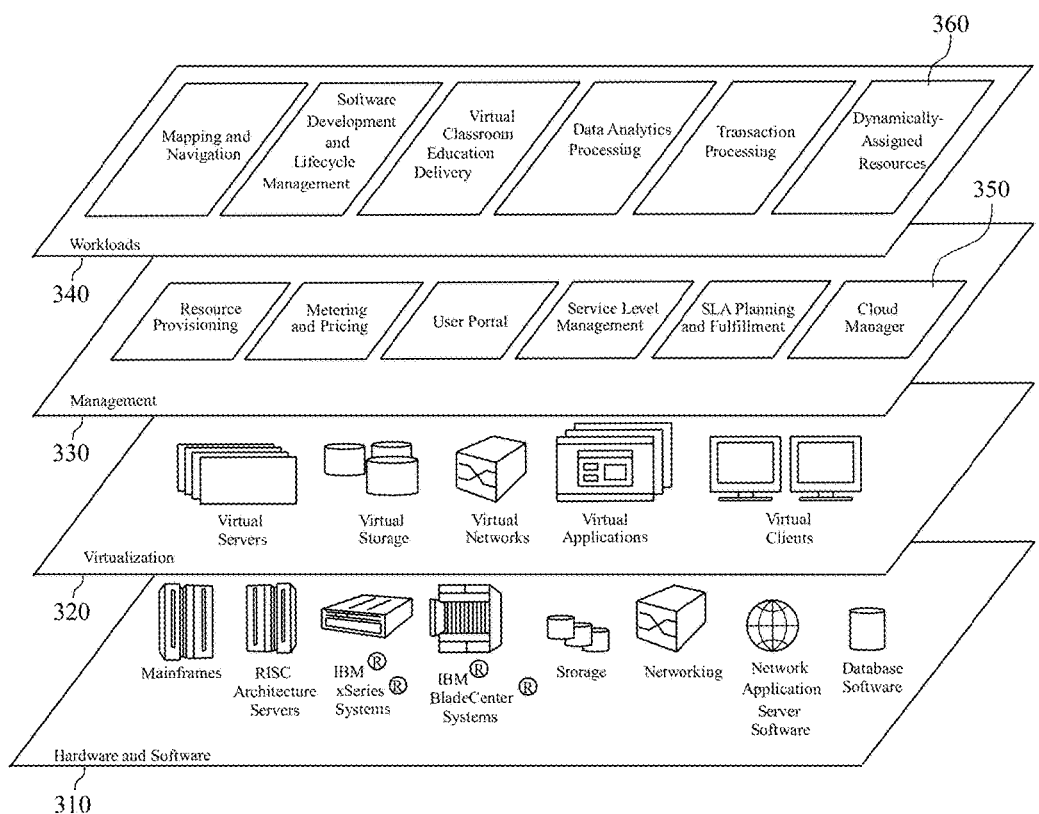
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a set of dynamically-assigned resources 360, which may be used as discussed in more detail below.

Figure 4:
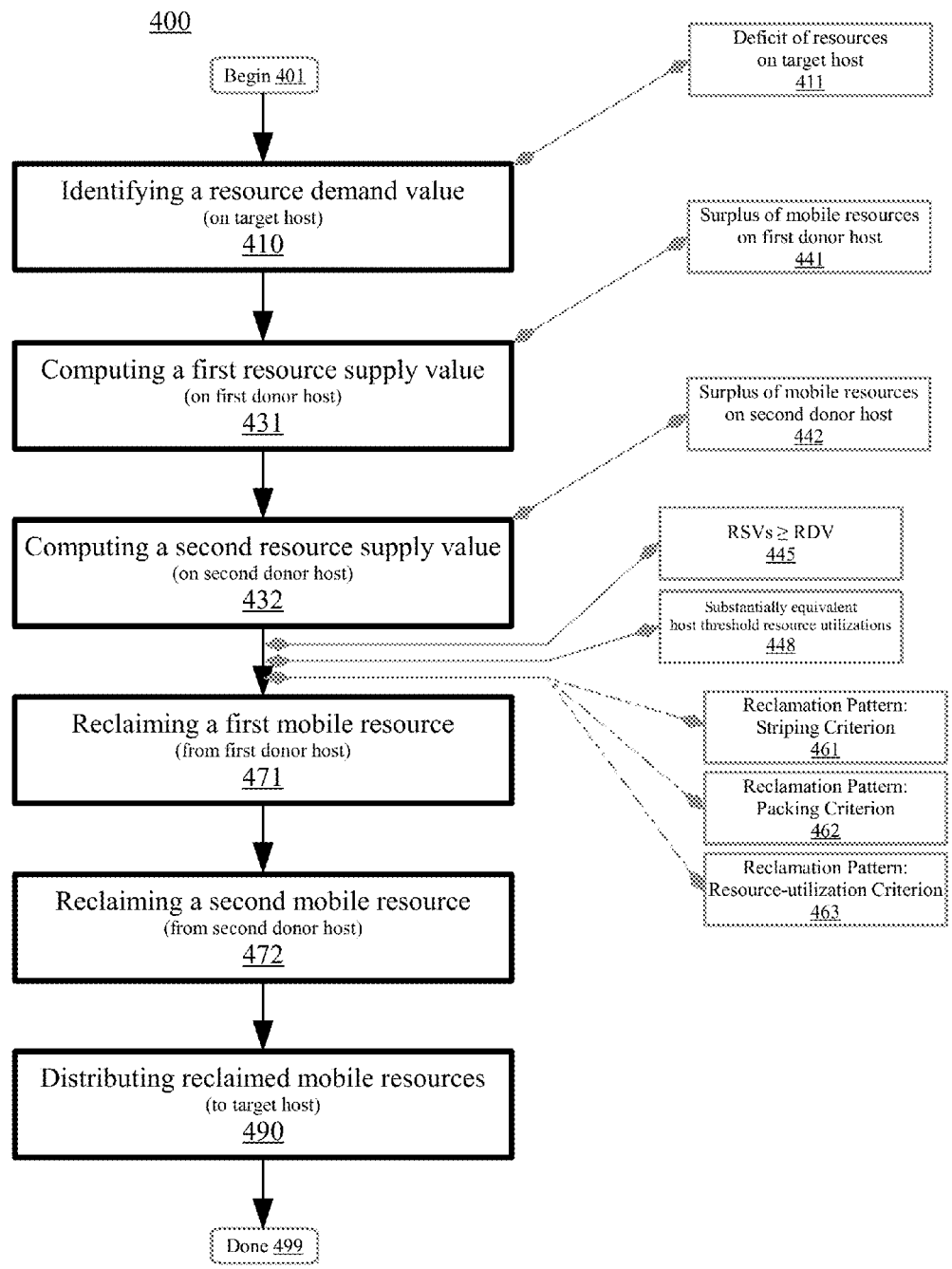
FIG. 4 is a flowchart illustrating a method for managing a shared pool of configurable computing resources according to embodiments.

FIG. 4 is a flowchart illustrating a method 400 for managing a shared pool of configurable computing resources according to embodiments. The shared pool of configurable computing resources may use a set of dynamically-assigned resources with respect to capacity-on-demand technology. Also, the shared pool of configurable computing resources may utilize a shared pool manager (e.g., a controller, a cloud manager) to execute/carry-out processes/tasks. The shared pool manager may or may not be included in the shared pool of configurable computing resources.

Capacity-on-demand technology can allow compute servers to have compute resources (e.g., processors, memory) dynamically assigned/activated (to make efficient use of licenses/costs). Capacity-on-demand technology can include built-in hardware resources which can be switched on online and without an interrupt either temporarily or permanently. The set of dynamically-assigned resources (e.g., processors, memory) may be referred to as mobile resources (e.g., non-dedicated resource licenses) which can be allocated to various hosts in response to a triggering event (e.g., as needed/desired/requested). Method 400 may begin at block 401.

At block 410, a resource demand value can be identified with respect to a target physical host of the shared pool of configurable computing resources. The resource demand value may be identified in order to achieve (e.g., meet) a target-physical-host-threshold-resource-utilization (i.e., threshold resource utilization on the target physical host). For example, the target physical host may be configured to have a set of assets (e.g., a set of virtual machines which run workloads) which may consume resources (e.g., processors, memory) at varying rates. The target physical host may have been programmed (e.g., predetermined, administrator/user-defined, machine-learned) to have a threshold resource utilization at which the target physical host should operate (e.g., a level/score generally not to be exceeded for performance/efficiency).

To illustrate, the threshold resource utilization for the target physical host may be 80% of processor utilization with respect to processor capacity. Such a utilization can be translated into a resource quantity (e.g., number of cores, amount of memory). For instance, 80% of processor utilization may include fully utilizing 40 out of 50 cores. If processor utilization reaches 90%, 45 out of 50 cores may be deemed as being utilized. A calculation may be made as to how many mobile cores may be dynamically-assigned to achieve the threshold resource utilization (80% in the example).

In embodiments, the resource demand value includes a measure of dynamically-assigned resources which indicates a deficit amount of dynamically-assigned resources on the target physical host with respect to the target-physical-host-threshold-resource-utilization at block 411. For instance, adding/distributing 7 mobile cores may reduce the processor utilization to approximately 79% (e.g., still utilizing 45 cores but then having a capacity of 57 cores). As such, the resource demand value in the example may be 7 units/cores (e.g., adding 5 cores would only reduce resource utilization to approximately 82%, adding 6 cores would reduce resource utilization to slightly above 80%). Similar computations may be made for resources such as memory. Other methodologies for calculating utilization(s) or demand value(s) are also considered.

At block 431, a first resource supply value is computed with respect to a first donor physical host of the shared pool of configurable computing resources. The first resource supply value corresponds to a first set of dynamically-assigned resources on the first donor physical host. The first resource supply value indicates expected achievement (e.g., meeting) of a first-donor-physical-host-threshold-resource-utilization (i.e., threshold resource utilization on the first donor physical host) without the first set of dynamically-assigned resources. For example, the first donor physical host may be configured to have a set of assets (e.g., a set of virtual machines which run workloads) which may consume resources (e.g., processors, memory) at varying rates. The first donor physical host may have been programmed (e.g., predetermined, administrator/user-defined, machine-learned) to have a threshold resource utilization at which the first donor physical host should operate (e.g., a level/score generally not to be exceeded for performance/efficiency).

To illustrate, the threshold resource utilization for the first donor physical host may be 80% of processor utilization with respect to processor capacity. Such a utilization can be translated into a resource quantity (e.g., number of cores, amount of memory). For instance, 80% of processor utilization may include fully utilizing 20 out of 25 cores. If 16 cores out of 25 cores are actually being utilized, utilization may be deemed to be 64%. A calculation may be made as to how many mobile cores may be reclaimed from the first donor host while still achieving the threshold resource utilization (80% in the example).

In embodiments, the first resource supply value includes a measure of the first set of dynamically-assigned resources which indicates a surplus amount of dynamically-assigned resources on the first donor physical host with respect to the first-donor-physical-host-threshold-resource-utilization at block 441. For instance, reclaiming 5 mobile cores may increase the processor utilization to 80% (e.g., still utilizing 16 cores but then having a capacity of 20 cores). As such, the first resource supply value in the example may be 5 units/cores (e.g., number of cores that can be reclaimed without exceeding the threshold of 80%). Similar computations may be made for resources such as memory. Other methodologies for calculating utilization(s) or supply value(s) are also considered.

At block 432, a second resource supply value is computed with respect to a second donor physical host of the shared pool of configurable computing resources. The second resource supply value corresponds to a second set of dynamically-assigned resources on the second donor physical host. The second resource supply value indicates expected achievement (e.g., meeting) of a second-donor-physical-host-threshold-resource-utilization (i.e., threshold resource utilization on the second donor physical host) without the second set of dynamically-assigned resources. Aspects related to the second resource supply value may be similar to or the same as aspects of the first resource supply value. Accordingly, the second resource supply value can include a measure of the second set of dynamically-assigned resources which indicates a surplus amount of dynamically-assigned resources on the second donor physical host with respect to the second-donor-physical-host-threshold-resource-utilization at block 442. A number of resource supply values may exist for a number of donor physical hosts (e.g., 15 different resource supply values may exist for 15 different compute nodes). As described herein, donor physical hosts need not be donors per se (e.g., givers) or have surpluses (e.g., excesses) with respect to dynamically-assigned resources but are presented as illustrative depictions. As such, certain donor physical hosts may have deficits or at least not have surpluses.

In embodiments, the resource demand value does not exceed a sum of the first and second resource supply values at block 445. As such, the target physical host can be accommodated by moving/transitioning mobile resources from the donor physical hosts without having a violation of a threshold of a particular/single donor physical host. For example, the resource demand value may be 9 units (e.g., cores), and resource supply values for four different donor physical hosts may be 4, 3, 2, 1 units respectively. Accordingly, the sum of the resource supply values (10) exceeds the resource demand value (9). Thus, 9 of the 10 surplus units of dynamically-assigned resources may be transitioned to the target physical host to fulfill its demand of 9 units of dynamically-assigned resources.

In certain embodiments, the target-physical-host-threshold-resource-utilization, the first-donor-physical-host-threshold-resource-utilization, and the second-donor-physical-host-threshold-resource-utilization are substantially equivalent at block 448. Substantially equivalent may include equal, equivalent, within 1%, or within 5% for example. For instance, the target-physical-host-threshold-resource-utilization may be 80%, the first-donor-physical-host-threshold-resource-utilization may be 79%, and the second-donor-physical-host-threshold-resource-utilization may be 75%. As another example, the target-physical-host-threshold-resource-utilization, the first-donor-physical-host-threshold-resource-utilization, and the second-donor-physical-host-threshold-resource-utilization may all be 85%.

In embodiments, a reclamation pattern to reclaim a group of dynamically-assigned resources may be determined using a criterion. The group of dynamically-assigned resources may be reclaimed using the reclamation pattern. Example criteria can include at least one of a striping criterion, a packing criterion, or a resource-utilization criterion. Such criteria may be included in a reclamation policy that defines how the mobile resources will be reclaimed from physical hosts.

The striping criterion may, for example, reclaim the mobile resources (relatively) evenly from across hosts in the system at block 461. For instance, a round-robin methodology may reclaim/pull mobile resources as follows: 1 unit from the first donor physical host, then 1 unit from the second donor physical host, then 1 unit from the third donor physical host, then 1 unit from the fourth donor physical host, then return to the first donor physical host if there are no other donor physical hosts with available surplus mobile resources. In general, the striping criterion may spread the impact of reclaiming mobile resources across various physical hosts (e.g., as many servers as possible). Aspects of using the striping criterion may have positive impacts on burden/load-balancing (e.g., relative to other methodologies).

The packing criterion, at block 462, can reclaim the mobile resources from the first donor physical host until it reaches the first resource supply value, and then move to the second donor physical host to do the same, and so on. For instance, a chunk methodology may reclaim/pull mobile resources from a first donor physical host until its surplus is exhausted (e.g., based on the first resource supply value), and then reclaim/pull mobile resources from a second donor physical host until its surplus is exhausted, and so on until the resource demand value is met (at which point the reclamation process may conclude). By reclaiming in chunks, fewer total physical hosts may be impacted. The physical hosts that are impacted, may be impacted more substantially (e.g., by isolating the impact to a limited number of servers while preserving mobile resources on other servers) than other methodologies (e.g., such as using the striping criterion which spreads the impact).

The resource-utilization criterion may, for example, reclaim the mobile resources from the busiest host at block 463 (e.g., based on processor/memory utilization during a temporal period), then move on to the next busiest host, and so on. Various combinations for reclamation of dynamically-assigned resources are considered (e.g., weighting reclamation using both the striping criterion and the resource criterion). For example, the round-robin methodology of the striping criterion may be used by starting with the busiest host as indicated by the resource criterion.

At block 471, a first dynamically-assigned resource is reclaimed from the first set of dynamically-assigned resources. Reclaiming the first dynamically-assigned resource may occur without exceeding the first resource supply value (e.g., so as not to cause the first donor physical host to demand another mobile resource because of it exceeding its threshold resource utilization). Reclaiming a mobile resource can include pulling the mobile resource (e.g., its license) from a given physical host and returning it to a pool of an available mobile resources for assignment/distribution. As such, reclaiming can include making the (previously unavailable/in-use) license available for assignment/allocation. At block 472, a second dynamically-assigned resource is reclaimed from the second set of dynamically-assigned resources. Reclaiming the second dynamically-assigned resource may occur without exceeding the second resource supply value. Reclaiming dynamically-assigned resources may continue as such to achieve the resource demand value (e.g., if the resource demand value is 5 and zero dynamically-assigned resources exist in an unassigned pool, reclaim at least 5 dynamically-assigned resources which have been assigned to hosts).

At block 490, the first and second dynamically-assigned resources are distributed to the target physical host (e.g., from a pool of available mobile resources which may have been previously reclaimed). The distribution may occur in order to meet the resource demand value. Meeting the resource demand value can achieve the target-physical-host-threshold-resource-utilization (e.g., thereby reducing the resource utilization on the target physical host to a level at or below its threshold resource utilization). For example, if 5 units of dynamically-assigned resources were reclaimed, distribution may include enabling the 5 units of corresponding licenses on the target physical host.

Method 400 concludes at block 499. Aspects of method 400 may provide performance or efficiency benefits for managing a shared pool of configurable computing resources. For example, aspects of method 400 may have positive impacts when using dynamically-assigned resources with respect to capacity-on-demand technology. Altogether, performance or efficiency benefits for resource utilization with respect to the physical hosts (or the dynamically-assigned resources) may occur (e.g., speed, flexibility, balancing, responsiveness, availability, resource usage, productivity).

Figure 5:
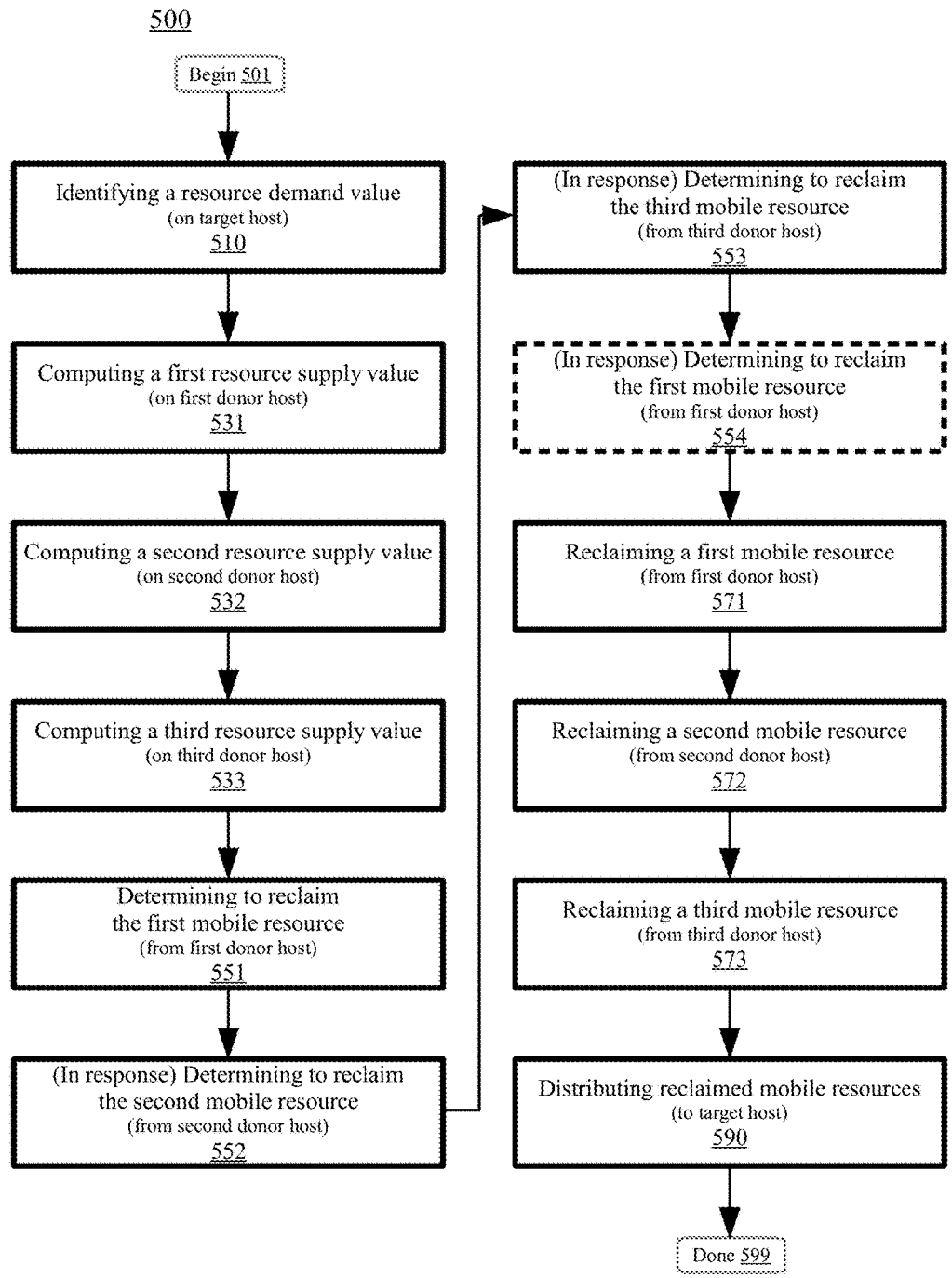
FIG. 5 is a flowchart illustrating a method for managing a shared pool of configurable computing resources according to embodiments.

FIG. 5 is a flowchart illustrating a method 500 for managing a shared pool of configurable computing resources according to embodiments. Aspects of method 500 may be similar or the same as aspects of method 400 and aspects may be utilized with other methodologies described herein (e.g., method 600, method 700). Method 500 may begin at block 501. At block 510, a resource demand value can be identified with respect to the target physical host. The resource demand value may be identified in order to achieve a target-physical-host-threshold-resource-utilization.

At block 531, a first resource supply value is computed with respect to a first donor physical host of the shared pool of configurable computing resources. The first resource supply value corresponds to a first set of dynamically-assigned resources on the first donor physical host. The first resource supply value indicates expected achievement of a first-donor-physical-host-threshold-resource-utilization without the first set of dynamically-assigned resources.

At block 532, a second resource supply value is computed with respect to a second donor physical host of the shared pool of configurable computing resources. The second resource supply value corresponds to a second set of dynamically-assigned resources on the second donor physical host. The second resource supply value indicates expected achievement of a second-donor-physical-host-threshold-resource-utilization without the second set of dynamically-assigned resources.

At block 533, a third resource supply value is computed with respect to a third donor physical host of the shared pool of configurable computing resources. The second resource supply value corresponds to a third set of dynamically-assigned resources on the third donor physical host. The third resource supply value indicates expected achievement of a third-donor-physical-host-threshold-resource-utilization without the third set of dynamically-assigned resources.

At block 551, it may be determined (e.g., based on resource demand values, resource supply values, reclamation patterns/orders) to reclaim the first dynamically-assigned resource from the first set of dynamically-assigned resources (on the first donor physical host). At block 552, in response to determining to reclaim the first dynamically-assigned resource from the first set of dynamically-assigned resources, it may be determined to reclaim the second dynamically-assigned resource from the second set of dynamically-assigned resources (on the second donor physical host). At block 553, in response to determining to reclaim the second dynamically-assigned resource from the second set of dynamically-assigned resources, it may be determined to reclaim the third dynamically-assigned resource from the third set of dynamically-assigned resources (on the third donor physical host) (e.g., blocks 551-553 illustrating use of a reclamation pattern). In embodiments, in response to determining to reclaim the third dynamically-assigned resource from the third set of dynamically-assigned resources, it may be determined to reclaim the first dynamically-assigned resource from the first set of dynamically-assigned resources at block 554 (e.g., blocks 551-554 illustrating use of reclamation pattern having a striping criterion).

At block 571, without exceeding the first resource supply value, a first dynamically-assigned resource is reclaimed from the first set of dynamically-assigned resources. At block 572, without exceeding the second resource supply value, a second dynamically-assigned resource is reclaimed from the second set of dynamically-assigned resources. At block 573, without exceeding the third resource supply value, a third dynamically-assigned resource is reclaimed from the third set of dynamically-assigned resources. Reclaiming dynamically-assigned resources may continue as such to achieve the resource demand value (e.g., if the resource demand value is 15 and 6 different physical hosts have 15 surplus dynamically-assigned resources in aggregate, reclaim the 15 dynamically-assigned resources from the 6 different physical hosts).

At block 590, to meet the resource demand value in order to achieve the target-physical-host-threshold-resource-utilization, the first, second, and third dynamically-assigned resources are distributed to the target physical host (e.g., thereby reducing the resource utilization on the target physical host to a level/score at or below its threshold resource utilization). Method 500 concludes at block 599. Aspects of method 500 may provide performance or efficiency benefits for managing a shared pool of configurable computing resources. For example, aspects of method 500 may have positive impacts when using dynamically-assigned resources with respect to capacity-on-demand technology. Altogether, performance or efficiency benefits for resource utilization with respect to the physical hosts (or the dynamically-assigned resources) may occur (e.g., speed, flexibility, balancing, responsiveness, availability, resource usage, productivity).

Figure 6:
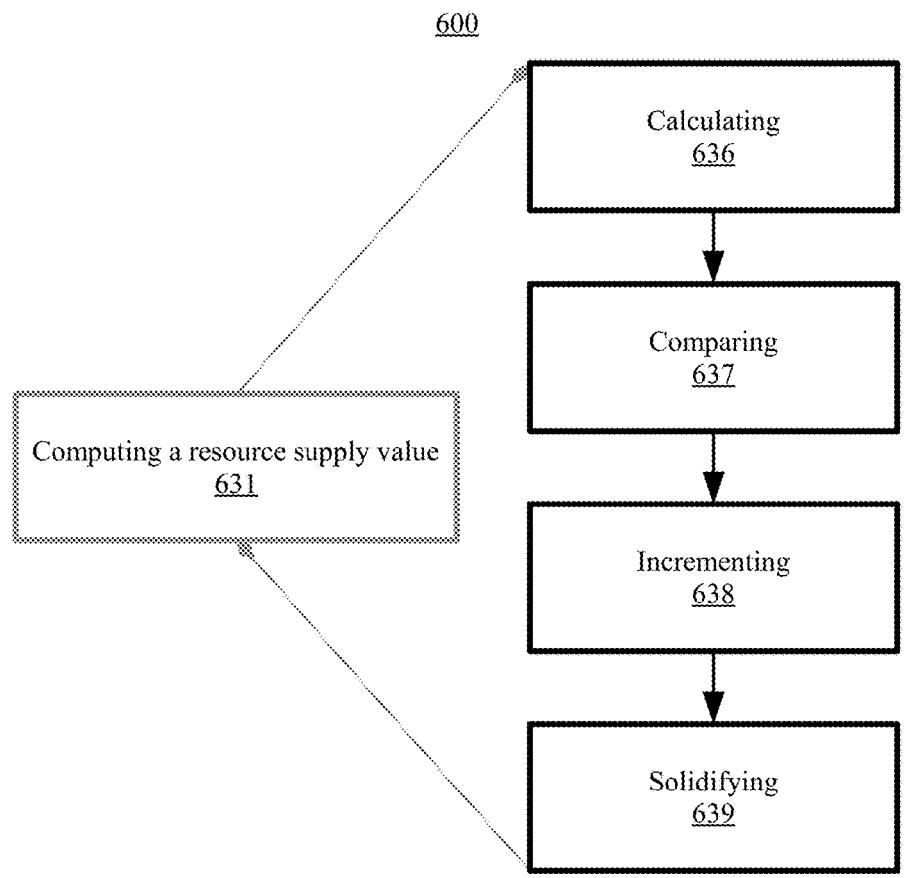
FIG. 6 is a flowchart illustrating a method for managing a shared pool of configurable computing resources according to embodiments.

FIG. 6 is a flowchart illustrating a method 600 for managing a shared pool of configurable computing resources according to embodiments. Aspects of method 600 may be at least part of computing a resource supply value depicted with respect to block 631 (e.g., which may be related to block 431/432/531/532/533/731/732 as described herein). At block 636, a predicted-first-donor-physical-host-resource-utilization with one fewer unit of the first set of dynamically-assigned resources on the first donor physical host may be calculated. For example, if the first donor physical host has a resource utilization of 75% with 20 units (e.g., using 15 units), the predicted-first-donor-physical-host-resource-utilization with 19 units may be forecast to be approximately 79% (e.g., in anticipation of reclaiming 1 unit).

At block 637, the predicted-first-donor-physical-host-resource-utilization can be compared with the first-donor-physical-host-threshold-resource-utilization. For instance, the predicted-first-donor-physical-host-resource-utilization of approximately 79% may be compared with a first-donor-physical-host-threshold-resource-utilization of 80%. As such, the first-donor-physical-host-threshold-resource-utilization exceeds the predicted-first-donor-physical-host-resource-utilization. In response to the first-donor-physical-host-threshold-resource-utilization exceeding the predicted-first-donor-physical-host-resource-utilization, the first resource supply value may be incremented by one unit at block 638 (e.g., from 0 to 1). Such an operation may continue from 1 to 2, 2 to 3, and so on.

At block 639, in response to the predicted-first-donor-physical-host-resource-utilization exceeding the first-donor-physical-host-threshold-resource-utilization, solidifying the first resource supply value for the first donor physical host without incrementing the first resource supply value. For example, if the first donor physical host has a resource utilization of 75% with 20 units (e.g., using 15 units), the predicted-first-donor-physical-host-resource-utilization with 19 units may be forecast to be approximately 79% (e.g., in anticipation of reclaiming 1 unit), and the predicted-first-donor-physical-host-resource-utilization with 18 units may be forecast to be approximately 83% (e.g., in anticipation of reclaiming 2 units). However, the predicted-first-donor-physical-host-resource-utilization with 18 units (83%) exceeds the first-donor-physical-host-threshold-resource-utilization (80%). As such, the first resource supply value may remain at 1 unit. The methodology may (then) perform similar computations for other donor physical hosts and solidify/establish the first resource supply value (without further computation).

Figure 7:
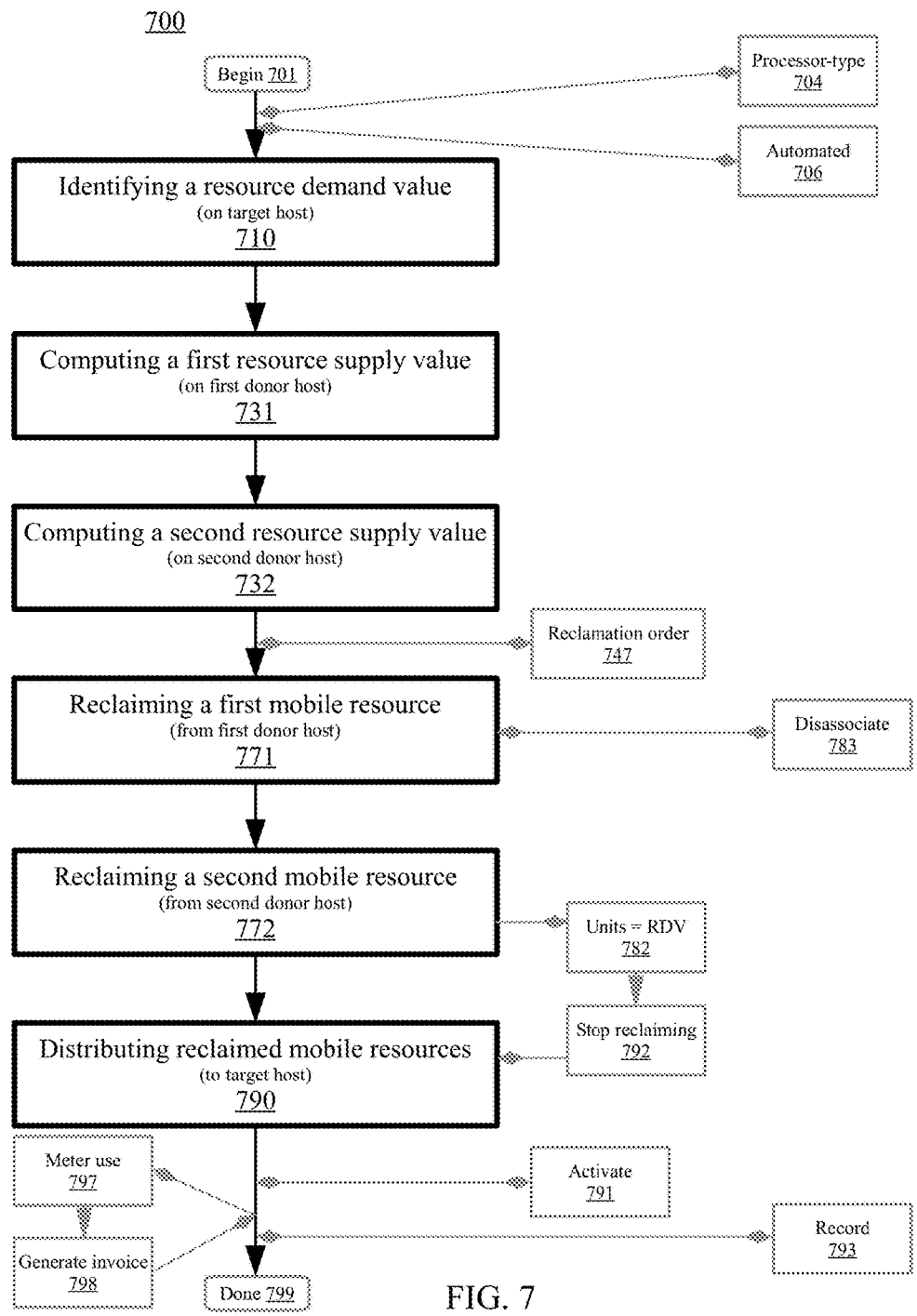
FIG. 7 is a flowchart illustrating a method for managing a shared pool of configurable computing resources according to embodiments.

FIG. 7 is a flowchart illustrating a method 700 for managing a shared pool of configurable computing resources according to embodiments. Aspects of method 700 may be similar or the same as aspects of method 400 and aspects may be utilized with other methodologies described herein (e.g., method 500, method 600). Method 700 may begin at block 701.

In embodiments, an x86 processor is absent with respect to the set of dynamically-assigned resources at block 704. x86 processors may utilize software hypervisors for virtualization. x86 processors can have additional layers with respect to non-x86 processors. In certain embodiments, support for a hypervisor is built into the chip (e.g., embedded firmware managing the processor and memory resources). Accordingly, the hypervisor may run as a piece of firmware code interacting with the hardware and virtual machines.

In embodiments, a resource manager may be used at block 706 to manage a set of operations in an automated fashion without user intervention as described herein (e.g., identifying a resource demand value, computing resource supply values, reclaiming dynamically-assigned resources, distributing dynamically-assigned resources). The resource manager may be included in the shared pool manager, or may be separate. As such, the resource manager can manage capacity-on-demand resources such as the set of dynamically-assigned resources (e.g., mobile/floating processors, mobile/floating memory).

At block 710, a resource demand value can be identified with respect to the target physical host. The resource demand value may be identified in order to achieve a target-physical-host-threshold-resource-utilization. At block 731, a first resource supply value is computed with respect to a first donor physical host of the shared pool of configurable computing resources. The first resource supply value corresponds to a first set of dynamically-assigned resources on the first donor physical host. The first resource supply value indicates expected achievement of a first-donor-physical-host-threshold-resource-utilization without the first set of dynamically-assigned resources. At block 732, a second resource supply value is computed with respect to a second donor physical host of the shared pool of configurable computing resources. The second resource supply value corresponds to a second set of dynamically-assigned resources on the second donor physical host. The second resource supply value indicates expected achievement of a second-donor-physical-host-threshold-resource-utilization without the second set of dynamically-assigned resources.

In embodiments, a reclamation order may be determined at block 747. The reclamation order can be determined based on both a group of resource supply values (e.g., the first resource supply value, the second resource supply value) for a group of donor physical hosts (e.g., the first donor physical host, the second donor physical host) and a group of predicted-donor-physical-host-resource-utilizations (e.g., the predicted-first-donor-physical-host-resource-utilization, the predicted-second-donor-physical-host-resource-utilization). For example, the group of donor physical hosts may be sorted (e.g., ranked ascending/descending) by resource supply value or a prediction of donor physical host resource utilization for the hosts after surrendering mobile resources. In certain embodiments, current resource utilization levels may be used. In various embodiments, weights or factors may be used (e.g., to assist/enable/enhance sorting).

At block 771, without exceeding the first resource supply value, a first dynamically-assigned resource is reclaimed from the first set of dynamically-assigned resources. In embodiments, reclaiming the first dynamically-assigned resource includes disassociating the first dynamically-assigned resource with respect to the first donor physical host at block 783. For example, a first host may initially have a license for use of a mobile processor, the resource manager may reclaim the license by disassociating/disconnecting the first host and the license (e.g., remove use of a particular processor on the first host, disconnect in a set of resource assignment data), and the resource manager may notify the user of the reclamation with a dialog box, e-mail, or the like.

At block 772, without exceeding the second resource supply value, a second dynamically-assigned resource is reclaimed from the second set of dynamically-assigned resources. A number of units of a group of dynamically-assigned resources equivalent to the resource demand value may be reclaimed at block 782. For example, if the resource demand value is 34 units, then 34 units may be reclaimed (e.g., to be present in the pool for distribution) from various sets of dynamically-assigned resources on various donor physical hosts. In response to reclaiming the number of units equivalent to the resource demand value, that number of units can be prepared to be distributed to the target physical host without reclaiming another unit at block 792 (e.g., stop reclaiming units once enough units are present in the pool for distribution to meet the resource demand value). In the example, 34 units are reclaimed and none further. At block 790, to meet the resource demand value in order to achieve the target-physical-host-threshold-resource-utilization, the first and second dynamically-assigned resources are distributed to the target physical host (e.g., thereby reducing the resource utilization on the target physical host to a level/score at or below its threshold resource utilization).

In various embodiments, the first and second dynamically-assigned resources are activated (e.g., turned-on, made available for use, a restriction/limitation is removed) on the target physical host at block 791. Activation may occur without disrupting other resources on other hosts. The activated set of dynamically-assigned resources can receive jobs, workloads, or tasks in response to activation (e.g., before or with priority relative to other resources on other hosts).

In certain embodiments, an indication that the target physical host includes the first and second dynamically-assigned resources is recorded in a set of resource assignment data at block 793 (e.g., coupling in a record a target physical host identifier and a mobile resource identifier for the first and second dynamically-assigned resources). In such embodiments, historical data may be recorded to indicate previous locations of dynamically-assigned resources (e.g., coupling in a historical record an initial host identifier and the mobile resource identifier for the first and second dynamically-assigned resources).

In embodiments, a usage assessment may be generated with respect to the capacity-on-demand technology. Use of the first and second dynamically-assigned resources may be metered at block 797. For example, mobile processors/memory allocated may be measured based on factors such as quantity allocated, temporal periods of allocation, actual usage, available usage, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 798. The generated invoice may be provided (e.g., displayed in a dialog box, sent or transferred by e-mail, text message, traditional mail) to the user for notification, acknowledgment, or payment.

Method 700 concludes at block 799. Aspects of method 700 may provide performance or efficiency benefits for managing a shared pool of configurable computing resources. For example, aspects of method 500 may have positive impacts when using dynamically-assigned resources with respect to capacity-on-demand technology. Altogether, performance or efficiency benefits for resource utilization with respect to the physical hosts (or the dynamically-assigned resources) may occur (e.g., speed, flexibility, balancing, responsiveness, availability, resource usage, productivity).

Figure 8:
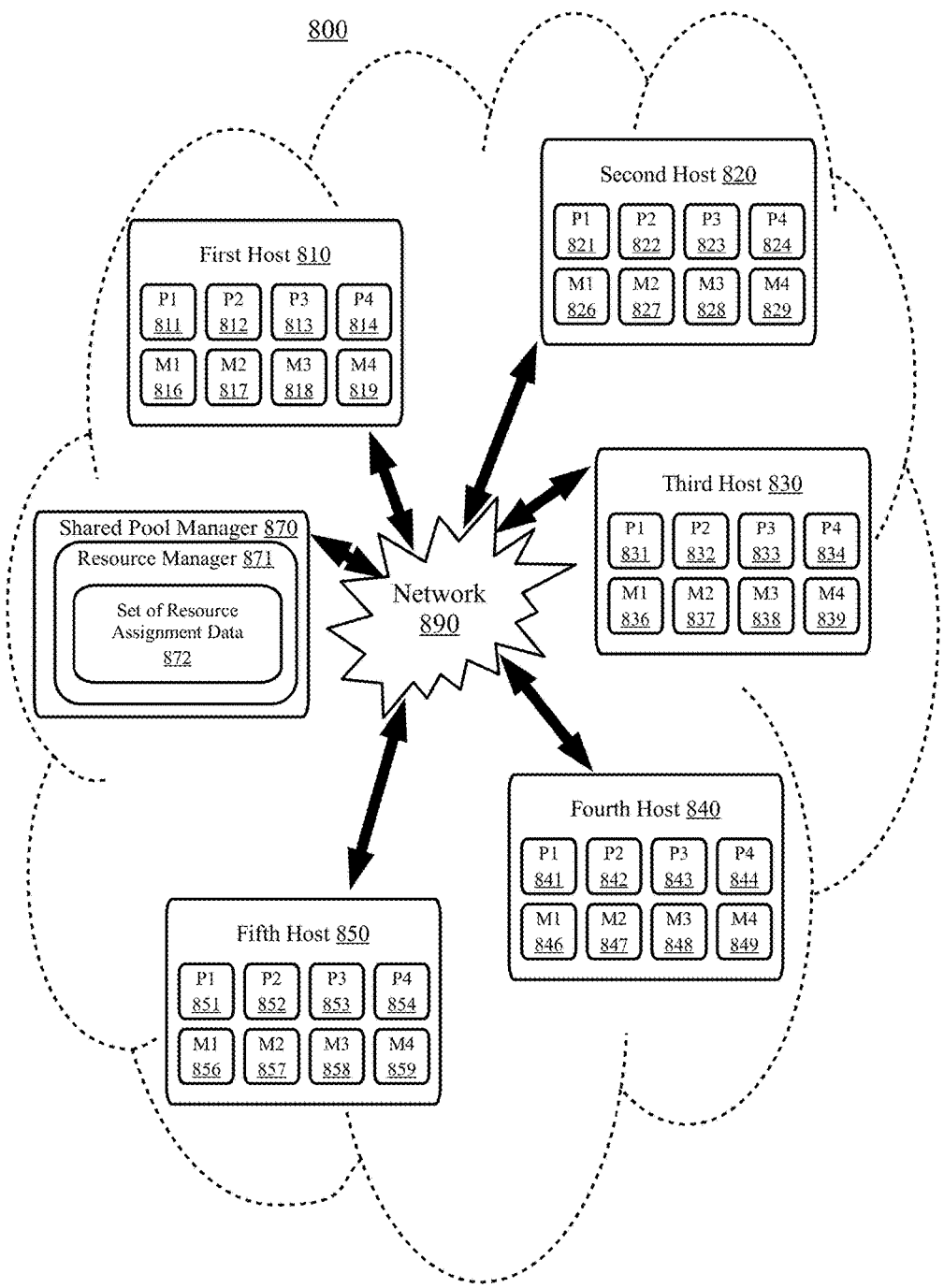
FIG. 8 shows an example system having a shared pool of configurable computing resources which uses dynamically-assigned resources with respect to capacity-on-demand technology according to embodiments.

FIG. 8 shows an example system 800 having a shared pool of configurable computing resources which uses dynamically-assigned resources with respect to capacity-on-demand technology according to embodiments. In embodiments, methods 400/500/600/700 may be implemented using aspects described with respect to the example system 800. As such, aspects of the discussion related to FIG. 4/5/6/7 and method 400/500/600/700 may be used or applied in the example system 800. Components depicted in FIG. 8 need not be present, utilized, or located as such in every such similar system, and such components are presented as an illustrative example. Aspects of example system 800 may be implemented in hardware, software or firmware executable on hardware, or a combination thereof. The example system 800 may include the shared pool of configurable computing resources (e.g., the cloud environment). Of course, example system 800 could include many other features or functions known in the art that are not shown in FIG. 8.

A shared pool manager 870 can include a resource manager 871 which has a set of resource assignment data 872. In various embodiments, at least one of the shared pool manager, the resource manager, or the resource assignment data a separate from one another. Such aspects can communicate with a set of hosts via network 890. The first host 810 may include a first set of processors (P1) 811 (e.g., representing 64 processor cores), a second set of processors (P2) 812, a third set of processors (P3) 813, a fourth set of processors (P4) 814, a first set of memory (M1) 816 (e.g., representing 64 memory elements), a second set of memory (M2) 817, a third set of memory (M3) 818, and a fourth set of memory (M4) 819. The second host 820, third host 830, fourth host 840, and fifth host 850 may be configured similarly (e.g., with respect to processors 821, 822, 823, 824, 831, 832, 833, 834, 841, 842, 843, 844, 851, 852, 853, 854 and memory 826, 827, 828, 829, 836, 837, 838, 839, 846, 847, 848, 849, 856, 857, 858, 859).

Capacity-on-demand technology allows hosts to have compute resources (e.g., processors, memory) dynamically activated (e.g., for efficiency of license costs). Consider example system 800 having 256 physical cores per host. However, a user's typical operational load may only generally require 500 of those cores active. As such, the user only licenses the system to run 500 cores which saves licensing fees associated with the remaining 156 cores per host (or 780 in total).

Based on historical information (e.g., past experience), a user may desire to account for peak temporal periods in the user's environment where the user requires additional processor capacity to meet workload demands. However, that extra capacity does not always need to be activated. As such, capacity-on-demand technology may be applied. Mobile cores (e.g., dynamically-assigned processors) may be utilized/purchased. The mobile cores can be dynamically-assigned one or more hosts. For example, the user may implement a group of 320 mobile core licenses. The group can be spread across the user's hosts in a user-defined manner. As such, benefits/savings may result compared to having to permanently license all of these cores (because they are rarely all needed at once). Also, the mobile cores may be assigned according to predetermined or user-defined methodologies (e.g., 0 to the first host, 70 to the second host, 70 to the third host, 80 to the fourth host, and 100 to the fifth host).

Consider the following example. The 5 physical hosts of FIG. 8 may have all 500 licensed mobile units/cores assigned to them (e.g., 100 units to each of the 5 hosts). In order to resolve an illustrative processor utilization imbalance on the fifth host, a periodic/ongoing task can be used to re-balance the environment. The task can determine (without manual intervention) that the fifth host needs an additional 20 mobile cores in order to reduce processor utilization to a given threshold. Aspects of the disclosure illustrate how the task can determine which of the 4 other hosts should have mobile cores reclaimed from them and how many cores should be reclaimed from each host order to both positively impact the violated fifth host by giving/assigning it 20 additional mobile cores and also keep the environment balanced by not violating threshold utilization levels on the other 4 hosts.

In embodiments, given a number of resources that need to be reclaimed in order to positively impact a host/server (e.g., bring its processor utilization to a certain threshold), an example algorithm can be used to determine what compute servers to reclaim from and how many mobile resources should be reclaimed from each server. The example algorithm may operate as follows. Until enough mobile resources have been identified/located to reclaim, and while compute servers exist to try to reclaim more from, a computation may be performed. For every compute server with potentially more resources to give up, calculate its predicted compute resource utilization if it gives up 1 unit of additional resource (e.g., unit/core, unit/gigabyte of memory). If the predicted value is less than or equal to a threshold, increment the number of resources that this server can give up. Otherwise, mark this server as having no more resources to give up. In certain embodiments, compute servers that can not give up at least 1 unit of resource are not considered. The list of remaining compute servers may be sorted based on: (a) the number of resources that the server can safely surrender (e.g., its predicted resource utilization value stays at or under the threshold), and (b) the predicted utilization with that number of resources reclaimed. The sorted list of servers/number of resources to reclaim from may be looped-through, and use each one of the servers to reclaim from until the number of resources that can be reclaimed matches the number of resources that are needed.

The example algorithm may have performance or efficiency benefits in that it may spread out the impact of reclaiming resources across as many servers as possible to reduce the chance of one server getting impacted too much. In effect, the example algorithm may limit the number of resources that are reclaimed from any one server such that the reclamation load is spread across several physical hosts, thereby limiting the overall impact to the donor hosts from which resources are being reclaimed. Another algorithm may limit the number of servers that are reclaimed from which may potentially result in a less-balanced environment. In such a less-balanced environment, the mobile resources may continue being moved/transitioned between hosts (e.g., inducing a "hot potato effect" in which the environment fails to determine a stable arrangement of resources).

Various aspects of the disclosure may be included in example system 800. Aspects may have performance or efficiency benefits relative to x86 systems, relative to live migrating a virtual machine for balancing, or relative to technologies which utilize a human/manual interface for reclaiming the dynamically-assigned resources. Consider the illustrative implementation elements and example reclamation routine which follow.

Aspects disclosed can, in embodiments, return a list of 2-tuples that represent a list of servers to reclaim from, and how many resources to reclaim from each server. For example, consider the following list of 2-tuples: [('serverA', 1), ('serverB', 1), ('serverC', 2)]. As such, the routine can result in taking 1 unit of the resource (e.g., mobile core, mobile memory) from serverA, 1 unit from serverB, and 2 units from serverC; illustrated as follows:

```
def find_servers_to_reclaim_from(threshold, num_resources_to_reclaim):
    potential_servers_to_reclaim_from = get_all_servers()
    possible_reclaims = [ ]
    for server_name in potential_servers_to_reclaim_from:
        current_resource_utilization = get_resource_utilization(server_name)
        current_mobile_resources = get_mobile_resources(server_name)
        current_active_resources = get_active_resources(server_name)
        # Only consider servers that have mobile resources that could be reclaimed
        # and that are currently less than the resource utilization threshold
        if mobile_resources > 0 and current_resource_utilization < threshold:
            possible_reclaims.append({'name': server_name,
                    'resources_to_reclaim': 0,
                    'predicted_resource_utilization': None,
                    'try_to_claim_more': True,
                    'mobile_resources': current_mobile_resources,
                    'active_resources': current_active_resources})
    # While not enough mobile resources have been identified to reclaim and while
    # there are still servers to try to reclaim more mobile resources from, loop through
    # each server that has been identified as a potential server to reclaim from and
    # determine if an additional resource can be reclaimed from it without violating
    # the threshold
    resources_identified_for_reclamation = 0
    while (resources_identified_for_reclamation < num_resources_to_reclaim and
```

```
            length([r for r in possible_reclaims if r['try_to_claim_more']) > 0):
    for reclaim in possible_reclaims:
        if not reclaim['try_to_reclaim_more']:
            # If it is determined that this server can not have any
            # more mobile resources claimed without violating the
            # threshold, or if the server has no more potential mobile
            # resources to reclaim, then just continue
            continue
        elif reclaim['resources_to_reclaim'] == reclaim['mobile_resources']:
            # There are no more potential mobile resources to reclaim from
            # this server, so stop trying to claim more
            reclaim['try_to_claim_more'] = False
            continue
        # Predict the resource utilization if one more resource is reclaimed
        predicted_resource_utilization = get_predicted_resource_utilization(
            server_name=reclaim['name'],
            num_new_resources=reclaim['resources_to_reclaim'] + 1)
        if predicted_resource_utilization <= threshold:
            # This additional mobile resource can be reclaimed without violating
            # the threshold, so increment the number of resource to reclaimed
            # and set the predicted resource utilization
            reclaim['resources_to_reclaim'] += 1
            reclaim['predicted_resource_utilization'] = predicted_resource_utilization
            resources_identified_for_reclamation += 1
        else:
            # If this mobile resource is reclaimed then the threshold will be
            # violated, so stop trying to claim more
            reclaim['try_to_claim_more'] = False
# Remove any possible reclaims if they have resources_to_reclaim set to
# 0 (i.e., if the server gave up any mobile resources it would violate the
# threshold)
possible_reclaims = [r for r in possible_reclaims if r['resources_to_reclaim'] > 0]
# Sort the reclamations first on the resources_to_reclaim to spread out the
# resource utilization impact across servers, and second on the predicted
# resource utilization. This results in a list that conceptually looks like
# this:     [server_name, num_resources, predicted_resource_utilization]
#           [serverA,  1,    0.3]
#           [serverB,  1,    0.4]
#           [serverC,  2,    0.2]
#           [serverD,  2,    0.5]
possible_reclaims = sorted(
    possible_reclaims,
    key=lambda x: (x['resources_to_reclaim'], x['predicted_resource_utilization']))
# Loop through the sorted list of possible reclaims and break out of the loop
# when enough resources to reclaim have been identified
resources_reclaimed = 0
reclaims = [ ]
for reclaim in possible_reclaims:
    if resources_reclaimed == num_resources_to_reclaim:
        # No more reclaims are needed
        break
    if (resources_reclaimed + reclaim['resources_to_reclaim']) >
num_resources_to_reclaim:
        # If reclaiming all of these resources would exceed the needed
        # amount, then only take the needed amount and break
        reclaims.append((reclaim['name'], num_resources_to_reclaim -
resources_reclaimed))
        break
    else:
        reclaims.append((reclaim['name'], reclaim['resources_to_reclaim']))
return reclaims
```

Aspects include routines to determine the predicted resource utilization when reclaiming resources. Computing predicted load for processor utilization after a certain number of cores may be reclaimed for the respective server as follows:
def get_predicted_cpu_utilization(compute_server, cores_to_remove):
""""

Given a compute server, calculates predicted CPU utilization for the compute server
  when a certain number of cores are deactivated.
  :param compute_server: the compute server from which cores would be removed and whose predicted CPU utilization to calculate
  :param cores_to_remove: number of cores to theoretically remove
  :return: predicted CPU utilization
""""

current_active_cores:=# of cores currently assigned to the compute server
current_cpu_utilization:=the current CPU utilization of the compute server (e.g., can be collected from industry tools such as Ceilometer, Nagios, Splunk, etc.)
cores_currently_used:=current_cpu_utilization*current_active_cores
new_active_cores:=current_active_cores−cores_to_remove

Calculate the estimated CPU utilization post core removal
    return cores_currently_used/new_active_cores Accordingly, host level processor utilization may be collected using the information and monitoring frameworks described herein.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a shared pool of configurable computing resources, the system comprising:

a memory having a set of computer readable computer instructions, and a processor for executing the set of computer readable instructions, the set of computer readable instructions including:

identifying, with respect to a target physical host of the shared pool of configurable computing resources, a resource demand value to achieve a target-physical-host-threshold-resource-utilization;

computing, with respect to a first donor physical host of the shared pool of configurable computing resources, a first resource supply value corresponding to a first set of dynamically-assigned resources on the first donor physical host, wherein the first resource supply value indicates the ability of the first donor physical host, without the first set of dynamically assigned resources, to not exceed a first-donor-physical-host-threshold-resource-utilization;

computing, with respect to a second donor physical host of the shared pool of configurable computing resources, a second resource supply value corresponding to a second set of dynamically-assigned resources on the second donor physical host, wherein the second resource supply value indicates the ability of the second donor physical host, without the second set of dynamically assigned resources, to not exceed a second-donor-physical-host-threshold-resource-utilization;

reclaiming a first dynamically-assigned resource from the first set of dynamically-assigned resources without exceeding the first resource supply value;

reclaiming a second dynamically-assigned resource from the second set of dynamically-assigned resources without exceeding the second resource supply value; and distributing, to meet the resource demand value to achieve the target-physical-host-threshold-resource-utilization, the first and second dynamically-assigned resources to the target physical host.

2. The system of claim 1, further comprising:

computing, with respect to a third donor physical host of the shared pool of configurable computing resources, a third resource supply value corresponding to a third set of dynamically-assigned resources on the third donor physical host, wherein the third resource supply value indicates expected achievement of a third-donor-physical-host-threshold-resource-utilization without the third set of dynamically-assigned resources;
determining to reclaim the first dynamically-assigned resource from the first set of dynamically-assigned resources;
determining, in response to determining to reclaim the first dynamically-assigned resource from the first set of dynamically-assigned resources, to reclaim the second dynamically-assigned resource from the second set of dynamically-assigned resources;
determining, in response to determining to reclaim the second dynamically-assigned resource from the second set of dynamically-assigned resources, to reclaim the third dynamically-assigned resource from the third set of dynamically-assigned resources;
reclaiming a third dynamically-assigned resource from the third set of dynamically-assigned resources without exceeding the third resource supply value; and
distributing, to meet the resource demand value to achieve the target-physical-host-threshold-resource-utilization, the third dynamically-assigned resource to the target physical host.

3. The system of claim 2, further comprising:
determining, in response to determining to reclaim the third dynamically-assigned resource from the third set of dynamically-assigned resources, to reclaim the first dynamically-assigned resource from the first set of dynamically-assigned resources.

4. The system of claim 1, further comprising:
determining, using a striping criterion, a reclamation pattern to reclaim a group of dynamically-assigned resources; and
reclaiming the group of dynamically-assigned resources using the reclamation pattern.

5. The system of claim 1, further comprising:
determining, using a packing criterion, a reclamation pattern to reclaim a group of dynamically-assigned resources; and
reclaiming the group of dynamically-assigned resources using the reclamation pattern.

6. The system of claim 1, further comprising:
determining, using a resource-utilization criterion, a reclamation pattern to reclaim a group of dynamically-assigned resources; and
reclaiming the group of dynamically-assigned resources using the reclamation pattern.

7. The system of claim 1, wherein:
the resource demand value includes a measure of dynamically-assigned resources which indicates a deficit amount of dynamically-assigned resources on the target physical host with respect to the target-physical-host-threshold-resource-utilization;
the first resource supply value includes a measure of the first set of dynamically-assigned resources which indicates a surplus amount of dynamically-assigned resources on the first donor physical host with respect to the first-donor-physical-host-threshold-resource-utilization; and
the second resource supply value includes a measure of the second set of dynamically-assigned resources which indicates a surplus amount of dynamically-assigned resources on the second donor physical host with respect to the second-donor-physical-host-threshold-resource-utilization.

8. The system of claim 1, wherein the target-physical-host-threshold-resource-utilization, the first-donor-physical-host-threshold-resource-utilization, and the second-donor-physical-host-threshold-resource-utilization are substantially equivalent.

9. The system of claim 1, wherein computing the first resource supply value includes:
calculating a predicted-first-donor-physical-host-resource-utilization with one fewer unit of the first set of dynamically-assigned resources on the first donor physical host;
comparing the predicted-first-donor-physical-host-resource-utilization with the first-donor-physical-host-threshold-resource-utilization; and
in response to the first-donor-physical-host-threshold-resource-utilization exceeding the predicted-first-donor-physical-host-resource-utilization, incrementing the first resource supply value by one unit, and
in response to the predicted-first-donor-physical-host-resource-utilization exceeding the first-donor-physical-host-threshold-resource-utilization, solidifying the first resource supply value for the first donor physical host without incrementing the first resource supply value.

10. The system of claim 1, further comprising:
determining a reclamation order based on both a group of resource supply values for a group of donor physical hosts and a group of predicted-donor-physical-host-resource-utilizations.

11. The system of claim 1, further comprising:
reclaiming a number of units of a group of dynamically-assigned resources equivalent to the resource demand value; and
distributing, without reclaiming another unit, the number of units of the group of dynamically-assigned resources to the target physical host.

12. The system of claim 1, wherein an x86 processor is absent with respect to the first and second sets of dynamically-assigned resources.

13. The system of claim 1, wherein identifying, computing, reclaiming, and distributing each occur in an automated fashion without user intervention.

14. The system of claim 1, further comprising activating at least a portion of the first and second dynamically-assigned resources on the target physical host.

15. The system of claim 1, wherein reclaiming the first dynamically-assigned resource includes disassociating the first dynamically-assigned resource with respect to the first donor physical host, and further comprising:
recording, in a set of resource assignment data, an indication that the target physical host includes the first dynamically-assigned resource, wherein the indication marks the location of the first dynamically-assigned resource, and wherein the set of resource assignment data includes historical data of previous locations of the first dynamically-assigned resource.

16. The system of claim 1, further comprising:
metering use of the first and second of dynamically-assigned resources; and
generating an invoice based on the metered use.

17. A computer program product for managing a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
identifying, with respect to a target physical host of the shared pool of configurable computing resources, a resource demand value to achieve a target-physical-host-threshold-resource-utilization;

computing, with respect to a first donor physical host of the shared pool of configurable computing resources, a first resource supply value corresponding to a first set of dynamically-assigned resources on the first donor physical host, wherein the first resource supply value indicates the ability of the first donor physical host, without the first set of dynamically assigned resources, to not exceed a first-donor-physical-host-threshold-resource-utilization;

computing, with respect to a second donor physical host of the shared pool of configurable computing resources, a second resource supply value corresponding to a second set of dynamically-assigned resources on the second donor physical host, wherein the second resource supply value indicates the ability of the second donor physical host, without the second set of dynamically assigned resources, to not exceed a second-donor-physical-host-threshold-resource-utilization;

reclaiming a first dynamically-assigned resource from the first set of dynamically-assigned resources without exceeding the first resource supply value;

reclaiming a second dynamically-assigned resource from the second set of dynamically-assigned resources without exceeding the second resource supply value; and distributing, to meet the resource demand value to achieve the target-physical-host-threshold-resource-utilization, the first and second dynamically-assigned resources to the target physical host.

18. The computer program product of claim 17, wherein the program instructions are stored in a computer readable storage medium in a data processing system, and wherein the program instructions were downloaded over a network from a remote data processing system.

19. The computer program product of claim 17, wherein the program instructions are stored in a computer readable storage medium in a server data processing system, and wherein the program instructions are downloaded over a network to a remote data processing system for use in a computer readable storage medium with the remote data processing system.

20. The system of claim 1, wherein the first and second sets of dynamically-assigned resources are one or more virtual machines that are configured in each of the first and second donor physical hosts in response to computing the first and second resource supply values, the first resource supply value associated with the first donor physical host and the second resource supply value associated with the second donor physical host, wherein the number of virtual machines in each of the first and second donor physical hosts is respectively equal the computed first and second resource supply values.

* * * * *